(12) United States Patent
Manjunath

(10) Patent No.: US 8,209,365 B2
(45) Date of Patent: Jun. 26, 2012

(54) TECHNIQUE FOR VIRTUALIZING STORAGE USING STATELESS SERVERS

(75) Inventor: Geetha Manjunath, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 570 days.

(21) Appl. No.: 12/175,283

(22) Filed: Jul. 17, 2008

(65) Prior Publication Data

US 2009/0030957 A1 Jan. 29, 2009

(30) Foreign Application Priority Data

Jul. 23, 2007 (IN) ............................. 1592/CHE/2007

(51) Int. Cl.
G06F 12/00 (2006.01)
G06F 17/30 (2006.01)
(52) U.S. Cl. ........................................ 707/827; 707/831
(58) Field of Classification Search .................. None
See application file for complete search history.

(56) References Cited

U.S. PATENT DOCUMENTS

| | | | | |
|---|---|---|---|---|
| 5,778,411 A * | 7/1998 | DeMoss et al. | .................... | 711/4 |
| 5,960,446 A * | 9/1999 | Schmuck et al. | ............. | 707/610 |
| 6,336,138 B1 * | 1/2002 | Caswell et al. | ............... | 709/223 |
| 6,356,863 B1 * | 3/2002 | Sayle | .............................. | 703/27 |
| 6,826,613 B1 * | 11/2004 | Wang et al. | .................... | 709/227 |
| 6,895,413 B2 * | 5/2005 | Edwards | ................................ | 1/1 |
| 7,203,730 B1 * | 4/2007 | Meyer et al. | ................... | 709/213 |
| 7,864,758 B1 * | 1/2011 | Lolayekar et al. | ............ | 370/389 |
| 2001/0034733 A1 * | 10/2001 | Prompt et al. | ................ | 707/102 |
| 2002/0059299 A1 * | 5/2002 | Spaey | ........................ | 707/104.1 |
| 2002/0091702 A1 * | 7/2002 | Mullins | ........................ | 707/100 |
| 2003/0131182 A1 * | 7/2003 | Kumar et al. | ..................... | 711/5 |
| 2003/0140051 A1 * | 7/2003 | Fujiwara et al. | ............. | 707/100 |
| 2004/0010654 A1 * | 1/2004 | Yasuda et al. | ..................... | 711/1 |
| 2004/0030668 A1 * | 2/2004 | Pawlowski et al. | ............... | 707/1 |
| 2004/0030822 A1 * | 2/2004 | Rajan et al. | ....................... | 711/4 |
| 2004/0039754 A1 | 2/2004 | Harple, Jr. | | |
| 2004/0044698 A1 * | 3/2004 | Ebata et al. | .................... | 707/200 |
| 2004/0068611 A1 * | 4/2004 | Jacobson et al. | .............. | 711/114 |
| 2004/0098415 A1 * | 5/2004 | Bone et al. | ..................... | 707/200 |
| 2004/0205143 A1 * | 10/2004 | Uemura | ........................ | 709/208 |
| 2004/0225691 A1 * | 11/2004 | Hirao | ............................. | 707/200 |
| 2005/0050271 A1 * | 3/2005 | Honda et al. | .................. | 711/114 |
| 2005/0172097 A1 * | 8/2005 | Voigt et al. | ..................... | 711/170 |
| 2005/0188006 A1 * | 8/2005 | Fujibayashi | ................... | 709/203 |
| 2006/0020586 A1 * | 1/2006 | Prompt et al. | ..................... | 707/3 |
| 2006/0047923 A1 * | 3/2006 | Kodama | ........................ | 711/161 |
| 2006/0123010 A1 * | 6/2006 | Landry et al. | ................... | 707/10 |
| 2006/0173873 A1 * | 8/2006 | Prompt et al. | ................ | 707/100 |

(Continued)

OTHER PUBLICATIONS

A Multi-protocol framework for ad-hoc service discovery, Carlos et al, MPAC'06 2006.*

(Continued)

*Primary Examiner* — Fred I Ehichioya
*Assistant Examiner* — Augustine Obisesan

(57) ABSTRACT

A system and method for virtualizing networked heterogeneous storage devices in a computing system using stateless servers is disclosed. In one embodiment, the method includes self discovery of mapping information between a plurality of virtual file systems to a plurality of physical file systems upon startup by a virtual data store (VDS) server. The networked heterogeneous storage devices include the plurality of physical file systems hosted on associated file servers. Further, each physical file system includes a storage space in which a plurality of data files may be stored.

20 Claims, 8 Drawing Sheets

U.S. PATENT DOCUMENTS

| | | | | |
|---|---|---|---|---|
| 2006/0288034 | A1* | 12/2006 | Do et al. | 707/102 |
| 2007/0038697 | A1* | 2/2007 | Zimran et al. | 709/203 |
| 2007/0043923 | A1* | 2/2007 | Shue | 711/170 |
| 2007/0239793 | A1* | 10/2007 | Tyrrell et al. | 707/200 |

OTHER PUBLICATIONS

Multi-dimensional storage virtualization, Huang et al, Sigmetrics/Performances,Jun. 12-16, 2004.*

GiSK: Makin Secure, reliable and scalable VO repository virtualizing generic disks in the grid, Kim et al, Proceeding of eight international conference on high-performance computing in Asia-Pacific (HPCASIA'05), 2005.*

"EMC: Products: Software: EMC Rainfinity Global File Virtualization", http://www.emc.com/products/software/rainfinity_gfv/index.jsp.

"Intelligent File Virtualization and the FAN Paradigm", Taneja Group, Sep. 2006.

"Brocade StorageX", http://www.brocade.com/products/tapestry/storagex.jsp Comments: Web Archive: Apr. 4, 2007.

"Common Virtual File System", http://jakarta.apache.org/commons/vfs/ Comments: Mar. 5, 2008.

Ian Foster., "What is Grid? A three point checklist", Argonne National Lab & University of Chicago Comments: Web Archive—Jul. 20, 2002.

"Enterprise Grid Alliance Adds Atlanta to Its Series of End User Forums; Extends Roster with Nov. 8 Event to Promote Benefits of Enterprise Grid Computing"; Business Wire, Oct. 26, 2005 http://www.gridalliance.org.

"The PBS Pro Project", http://www.pbspro.com/.

"Data Sharing With Storage Resource Broker," http://www.nirvanastorage.com/.

Eunsung Kim et al., "GiSK: Making Secure, Reliable and Scalable VO Repository Virtualizing Generic Disks in the Grid", Proceedings of the Eighth International Conference on High-Performance Computing in Asia-Pacific Region (HPCASIA'05) IEEE 2005.

Lan Huang et al., "Multi-Dimensional Storage Virtualization", SIGMETRICS/Performance'04, Jun. 12-16, 2004, New York, NY, USA.

Carlos A. Flores-Cortes et al., "A Multi-protocol Framework for Ad-hoc Service Discovery", Computing Department, Lancaster University, Lancaster, LA1 4YR, UK.

* cited by examiner

TECHNIQUE FOR VIRTUALIZING STORAGE USING STATELESS SERVERS

RELATED APPLICATIONS

This patent application claims priority to Indian patent application serial number 1592/CHE/2007, having title "A Technique for Virtualizing Storage using Stateless Servers", filed on 23 Jul. 2007 in India (IN), commonly assigned herewith, and hereby incorporated by reference.

BACKGROUND

Recently, the amount of data stored in the information systems has been increasing tremendously; therefore, amount of storage needed by companies and/or organizations is also significantly increasing. As with other sizeable business expense, it may be desirable to reduce cost of managing and maintaining a storage system. Further, simplified use of complex storage environment may be one of the biggest customer challenges today. Furthermore, an explosive growth of data storage and/or massive proliferation of file servers and Network-Attached Storage (NAS) appliances may have created a management nightmare for storage administrators. The most complex issue involving the growth of data storage may be the inability to manage storage environments efficiently.

Currently, every file server is an independent file system that can require individual management on a regular basis. These file servers can require applications to select and name the specific hardwired server hosting the desired files. Typically, when applications outgrow the storage provided by a file server, IT (Information Technology) administrators must bring down the applications, add new storage devices, partition and move some of the data, and/or reprogram the applications to make them aware of the new division of resources.

For example, in storage technology, such as NAS, adding a first file server may be generally easy. However, adding a second file server can again require setting up network shares and informing users of its existence so that they can mount/map to the second file server. Thus, each successive server addition in the NAS can require additional administrative setup and may result in operational complexities for the IT administrators and/or users. This not only is an administrative overhead but can also cause added difficulties for users and applications to navigate via these multiple file systems located in several storage devices.

Typically, accessing files in the NAS may require knowing exact share where they are located; cross-volume data search can be difficult and if files are moved or storage reconfigured for load balancing, user access can be interrupted. Further, each NAS device sitting on a LAN can have a limited throughput as it is an island unto itself. IT administrators have to statically partition the storage among these islands, which can have a number of unpalatable consequences.

Generally, procured storage environments grow heterogeneously, as the IT administrators may not want to get locked into a specific vendor. Further, storage environments are going towards multi-site organizations with geographically distributed business units under different administrative domains. The required ongoing investments in both hardware/software and people into these storage environments continue to rise. Many organizations are looking for alternative solutions to reduce the cost by maximizing utilization of resources across the globe through the use of Grid computing.

Today, organizations need to consider new storage management strategies based on performance, intelligent systems, and/or sophisticated software that can enable the management of existing data and/or existing networks while increasing uptime and reducing the cost of data storage. Currently, Hierarchical Storage Management (HSM) is a technique that is used for efficiently managing large amounts of data. In this technique files/data are assigned to various storage media based on how fast and/or how frequently they are needed. However, HSM of data during lifecycle of files and/or folders can be a challenging task as there may be a need to migrate files from one storage to another based on dynamic conditions.

The main challenge can be how to manage large amounts of data that is constantly increasing in volume, and at the same time to control the cost associated with the data management while trying to lower the total cost of ownership.

Current techniques for integrating file systems by providing a global namespace across storage environments are generally appliance solutions that can either require a custom hardware and/or meta-data servers for performing mapping of the virtual store to physical store which can be a limiting scalability solution. Further, the current techniques may fail to support multiple file system, stored on different back ends. Furthermore, the current techniques generally fail to assimilate existing file systems and can require custom hardware to provide scalable solutions as they use stateful servers. Moreover, the current techniques may fail to support heterogeneous platforms and/or storage elements. Also, the current techniques may not provide data migration coupled with virtualization.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A technique for virtualizing storage using stateless servers is disclosed. In the following description, for purposes of explanation, numerous specific details are set forth in order to provide a thorough understanding of the various embodiments. It will be evident, however, to one skilled in the art that the various embodiments may be practiced without these specific details.

The terms "physical repositories", "file systems" and "file servers" are used interchangeably throughout the document. Also, the terms "client interface layer" and "presentation protocol layer" are used interchangeably throughout the document. In addition, the terms "policy engine" and "management console" are used interchangeably throughout the document.

Figure 1:
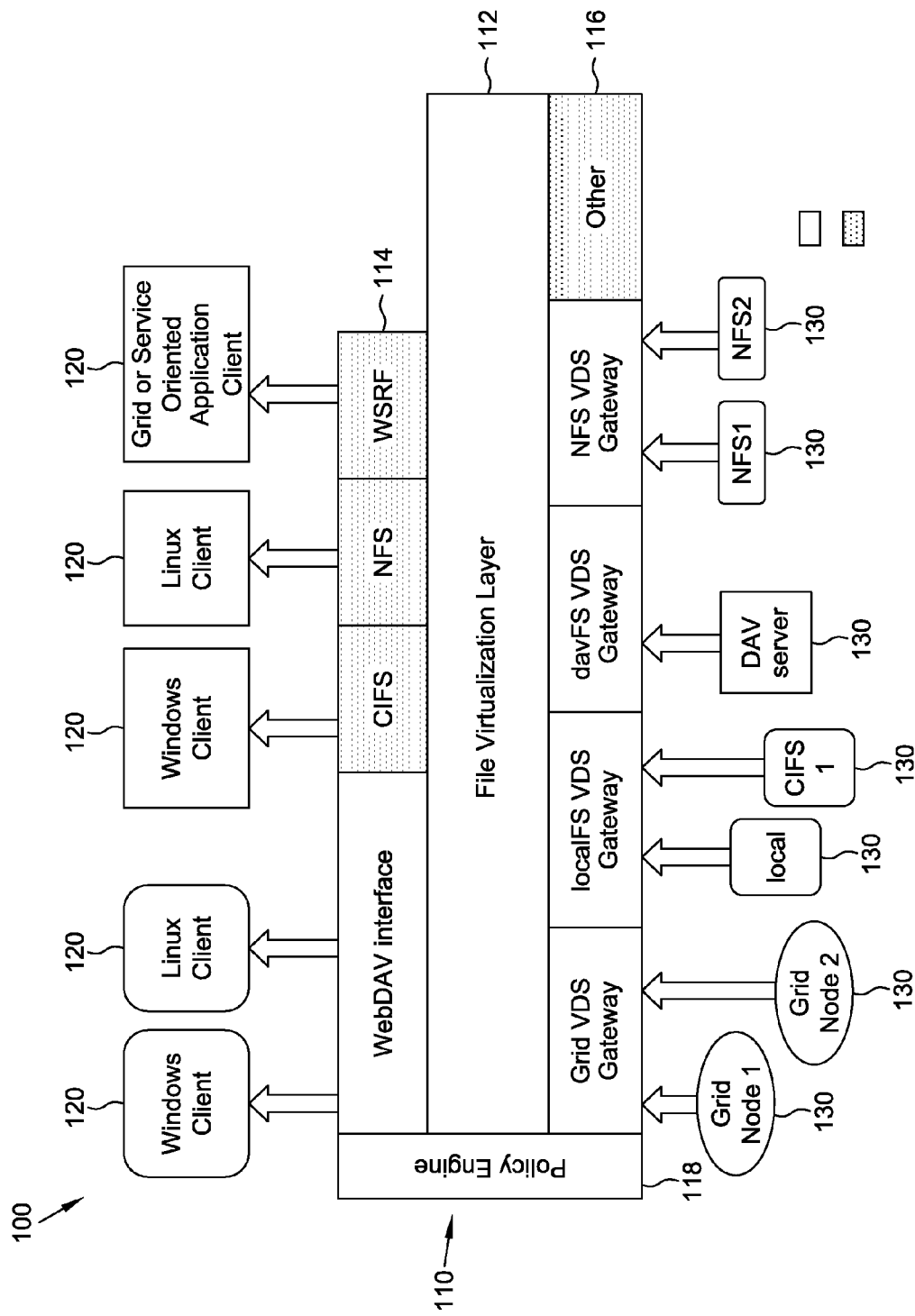
FIG. 1 is a block diagram illustrating a high level architecture of a storage virtualizer (VDS), according to one embodiment.

FIG. 1 is a block diagram illustrating a high level architecture of a storage virtualizer (VDS), according to one embodiment. Particularly, FIG. 1 illustrates a VDS component 110, a plurality of clients 120, and a plurality of physical file systems hosted on associated file servers, heterogeneous file servers and/or physical repositories 130. Exemplary file servers include Grid file servers, Unix file servers, Windows file servers, and Web-based file servers. Further as shown in FIG. 1, the VDS component 110 includes a file virtualization layer 112, a client interface layer 114, a protocol gateways layer 116, and a policy engine 118.

As shown in FIG. 1, the client interface layer 114 includes client interfaces, such as Web-based Distributed Authoring and Versioning (WebDAV) interface, Common Internet File System (CIFS) interface, Network-attached storage File System (NFS) interface, Web Services Resource Framework (WSRF) interface, and the like. Further as shown in FIG. 1, each client interface in the client interface layer 114 is connected to an associated client, such as Windows client, Linux client and/or Service Oriented Application client. Furthermore as shown in FIG. 1, the protocol gateways layer 116 includes exemplary protocol gateways, such as Grid VDS Gateway, local File System (localFS) attached directly to a server VDS Gateway, distributed authoring and versioning File System (davFS) VDS Gateway, Network-attached storage File System (NFS) VDS Gateway, and the like.

FIG. 1 shows each protocol gateway in the protocol gateways layer 116 connected to one or more associated physical file systems that support a specific protocol and are hosted on servers located in computing networks, such as Grid Node 1, Grid Node 2, Local network, CIFS 1, DAV server, NFS 1, NFS 2 and so on. Each protocol gateway may provide a common pre-determined file operation interface to the file virtualization layer 112 while internally handling protocol-specific operations for the file system that it is associated with. In these embodiments, each physical file system includes a storage space in which a plurality of data files may be stored. Also in these embodiments, a VDS server hosts the VDS component 110.

In operation, the VDS component 110 self discovers mapping information between a plurality of virtual file systems to the plurality of physical file systems 130 upon startup. In some embodiments, the file virtualization layer 112 determines available physical file systems to be virtualized based on configuration information. Further, the file virtualization layer 112 communicates with each available physical file system via an associated gateway in the protocol gateways layer 116 to determine a list of subdirectories in each root directory of the physical file system. The file virtualization layer 112 then maps each subdirectory to an associated physical repository gateway object used to determine the list of stored root directories and store in a directory cache.

Also during operation, the presentation protocol layer 114 receives a request for a virtual file from one of the plurality of clients 120. Exemplary clients are Windows client, Linux client, Service Oriented Application client, and the like. The file virtualization layer 112 then determines the physical repository gateway object that should be used to obtain the associated physical files and folders (as shown in the FIG. 7).

The protocol gateways layer 116 then obtains an associated physical file via the determined physical repository gateway object based on the stored mapping information in the directory cache to obtain the requested virtual file to perform a requested file operation. Also, the above virtual file system can serve a file from a file server supporting protocol A to a client supporting protocol B. This technique can break one-to-one mapping of protocols that generally exists between a file server and a user/client (i.e., a CIFS file system can now be used by a NFS client and vice versa). This technique virtualizes protocol as well (i.e., client of protocol B can access client of protocol A).

In some embodiments, the file virtualization layer 112 refreshes the directory cache in the VDS server for a subset of entries upon creating a new subdirectory in the root directory in anyone of the physical file systems hosted on associated one of the physical repositories 130.

For example, when a user accesses a specific file from a standard Linux client, the operation is dispatched to the Web-DAV server through a kernel connected davFS client. The file virtualization layer 112 then performs required mapping from a logical namespace to a physical namespace and an actual physical storage device that holds the data is identified. The associated protocol for accessing the physical data is accessed and provided to the user. In this scenario, the user is generally unaware of the actual physical repository/file system 130 from which the data file is fetched and provided. Further, the user may also be unaware of protocol supported by an associated machine source.

Figure 2:
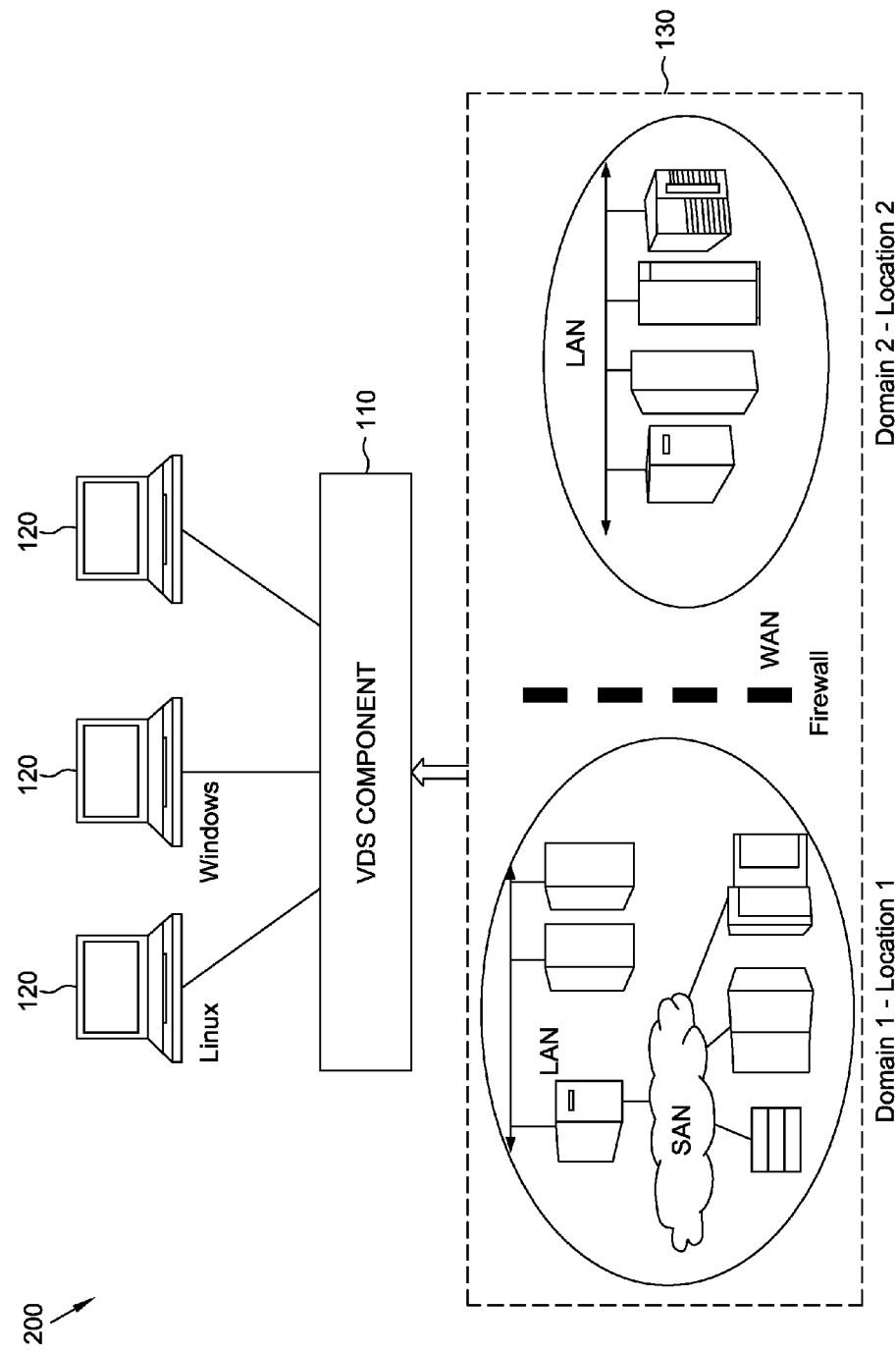
FIG. 2 is a block diagram illustrating a high level view of virtualizing data across multiple administrative domains using a Grid computing infrastructure and the VDS, according to one embodiment.
Figure 3:
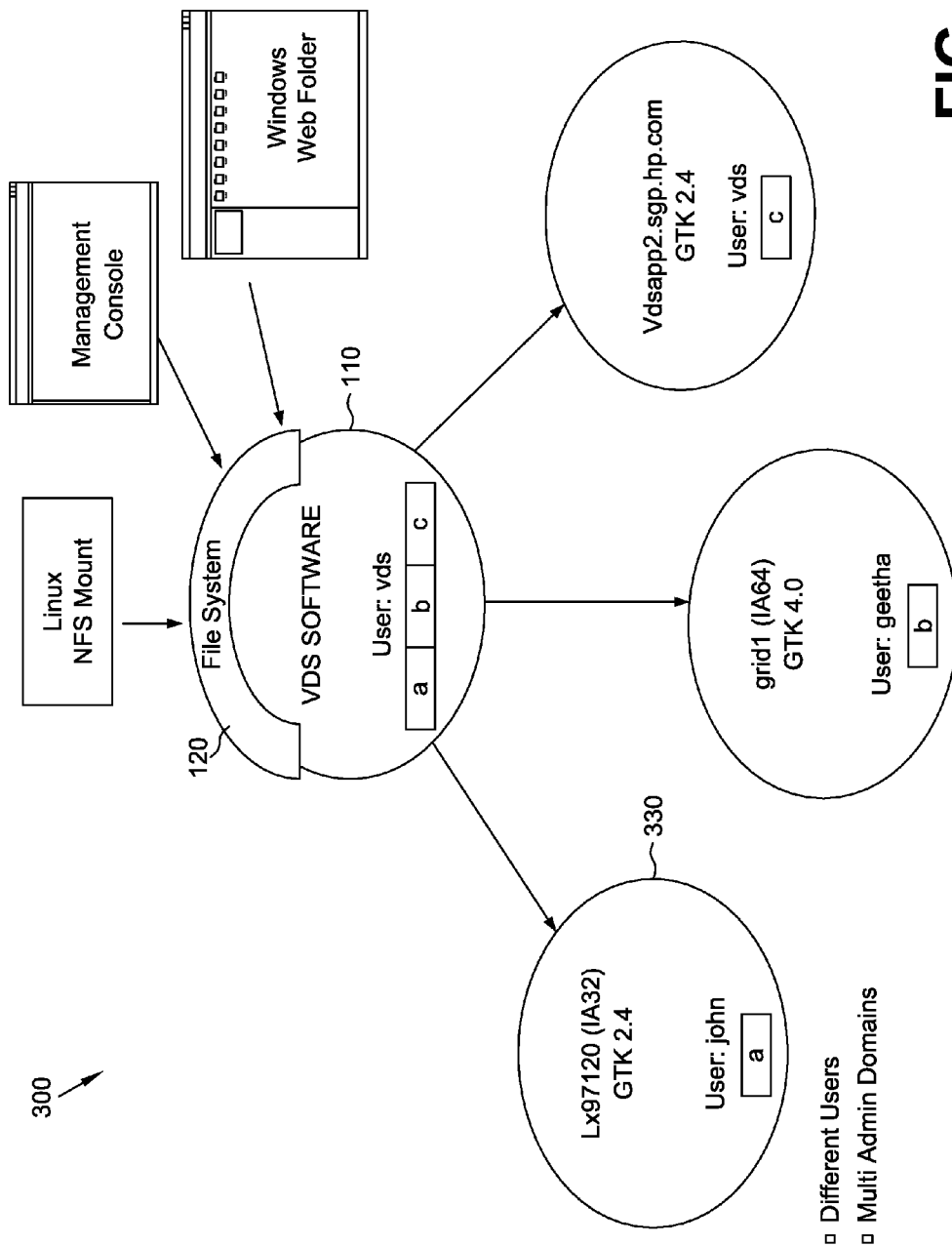
FIG. 3 is a block diagram illustrating a high level functionality of the virtualizing data over grid nodes, providing a user specific view of a virtualized file system, according to one embodiment.

FIG. 2 is a block diagram illustrating a high level view of virtualizing data across multiple administrative domains using a Grid computing infrastructure and the VDS, according to one embodiment. It can be seen in FIG. 2 that the VDS component 110 hosted on the VDS server can be used for performing virtualization on storage elements that are directly attached to the VDS server (DAS), Network-attached storage (NAS) File Server, i.e., accessible over a network through NFS, CIFS, and the like and/or a file server connected via a Wide Area Network (WAN), i.e., available in Grid nodes (i.e., the Grid nodes 330 as illustrated in FIG. 3). In case of the Grid nodes, the VDS server can be envisioned to run at the users' end wherein only the files and/or directories that the user is authorized to view are shown (i.e., a user-based custom view of the file system can be achieved).

FIG. 3 is a block diagram 300 illustrating a high level functionality of virtualizing data over Grid nodes 330, providing a user specific view of a virtualized file system, according to one embodiment. As shown in FIG. 3, the current technique allows a user based custom view of a file system based on authentication. As shown in FIG. 3, in the case of Grid nodes 330, there may be a need to map users of one administrative domain (i.e., domain 1, location 1) to another administrative domain (i.e., domain 2, location 2) based on the accessed mapping at a destination Grid node. For example, if there are three Grids and that do not have a central administration, the current virtual enterprise file system may allow access to remote file after mapping a foreign user to a local user, i.e., the current virtual enterprise file system may allow a user named Geetha 1 in Grid node 1 to use in Grid node 2 even when user name Geetha 1 is not in the Grid node 2.

In a Grid specific usage framework 300 shown in FIG. 3, the implementation is layered over Grid File Transfer Protocols (GridFTPs), Application Programming Interfaces (APIs), and/or services, which are optimized for handling substantially large datasets (i.e., parallel data transfer and/or striped transfer) and for better utilization of an available network bandwidth that can be used. Further in these embodiments, different physical repositories 330 can exist in different administrative domains (for example, John in machine 1 and Peter in machine 2), a user-map file in a Grid Middleware can be exploited to provide right privileges and map the corresponding user's data on a remote machine. The above-described virtualization framework can accommodate file level authorization enabling different views based on type of user. In some embodiments, the VDS can be accessed by other Grid nodes and can be even based on Linux and Windows machines without any additional client software.

Figure 4:
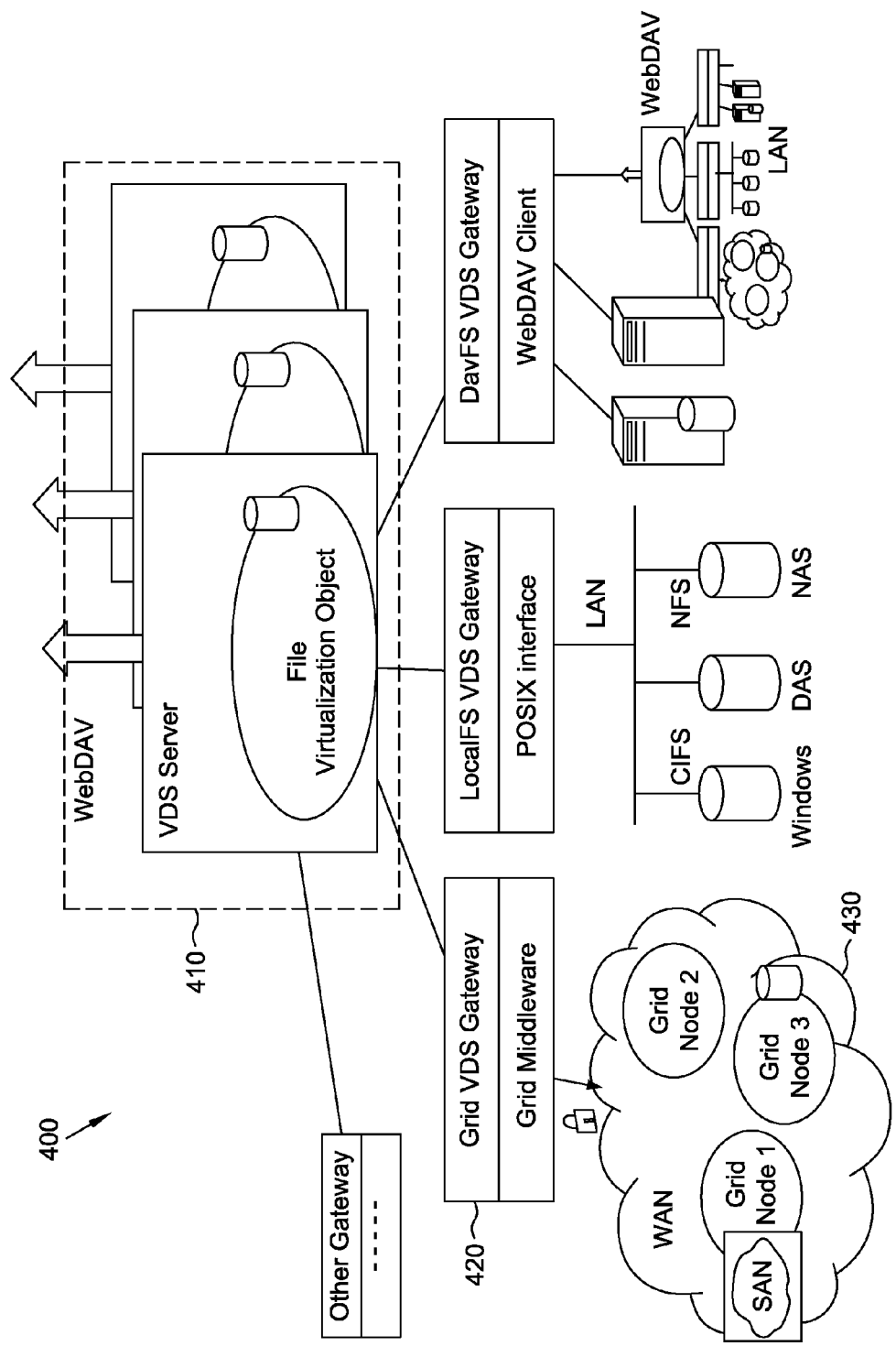
FIG. 4 is a block diagram illustrating a high level functionality of a virtual file system using the VDS that is hosted on each of multiple servers located in a computing system, according to another embodiment.

FIG. 4 is a block diagram illustrating a high level functionality of a virtual file system 400 using a VDS that is hosted on each of multiple servers located in a computing system, according to another embodiment. As shown in FIG. 4, the virtual file system 400 includes multiple VDS servers 410 each hosting the VDS, associated gateways 420 and multiple physical file systems and/or physical repositories 430, such as Grid nodes and Local Area Network (LAN) based NFS and CIFS. In these embodiments, it can be envisioned that due to self discovery of mapping information, each VDS server need not save any state information and thus amount of communication needed between the multiple VDS servers 410 can be minimal, i.e., a new directory creation, and the like. This enables the VDS architecture to significantly improve scalability of the complete system. For example, including more number of VDS servers can significantly increase throughput of the virtual file system 400 and hence can improve the performance.

In some embodiments, the multiple VDS servers 410 can jointly serve different parts of the same file (i.e., by using an intelligent client that ties all the parts of a file)—this can also significantly increase the performance. Further in these embodiments, when the VDS server is overloaded (i.e., many clients requesting files from a single VDS server), it can choose to send the file system request to a neighboring VDS server—thus assisting in load balancing. It can be envisioned that the multiple VDS servers 410 can be used for fault tolerance, improving performance, scalability and/or load balancing of the virtual file system 400.

The above-described mapping algorithm do not save any state information and therefore in an event of failure of the VDS server it can come up just like a web server and start functioning again without any loss of information. Also, it can be seen that the current technique performs mapping without using any metadata server as each VDS server self determines mapping information by looking at the physical repository upon startup, i.e., it determines the mapping information between the physical and virtual file systems using a current state of the physical repository. The virtualization technique allows a physical server to come in and out of the VDS server.

Figure 5:
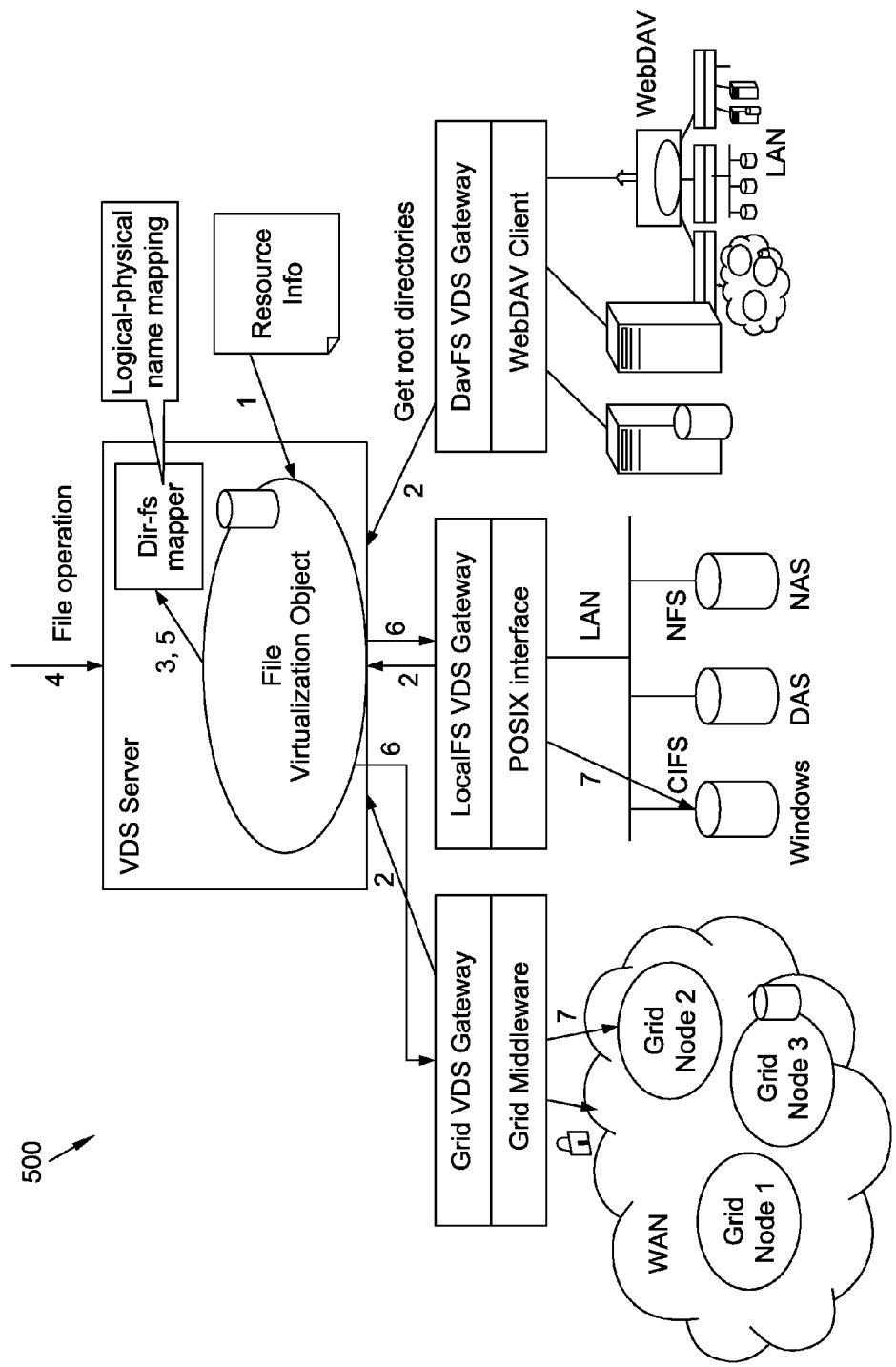
FIG. 5 is a block diagram illustrating a high level functionality of the virtual file system obtained using components that create a global namespace, according to another embodiment.

FIG. 5 is a block diagram illustrating a high level functionality of a virtual file system 500 obtained using components that create a global namespace, according to another embodiment. The Dir-FS mapper maintains the self discovered mapping of the physical directories to the physical repositories gateway objects. The above-described virtualization framework creates a VDS over multiple storage entities providing a single view of all the storage devices. It consolidates scattered data on all physical file systems and presents a single file system to the user enabling distributed data to be transparently accessed and managed. The VDS provides a global namespace for the files spread across multiple heterogeneous and distributed storage systems.

Further, the VDS can provide virtualization of storage, data and access. For example, when a user wants a specific amount of free space, the user need not search for a storage device having sufficient disk space and acquire rights to access. In these embodiments, the user need not remember the particular physical server on which the data is stored, as accessing the above-described virtualization framework can ensure accessing the desired storage device and file. The above virtualization framework can support multiple protocols. Also in these embodiments, the access mechanism for each connected storage resource is hidden from the user.

As described above, the physical repository can be a Grid node supporting standard Globus IO and GridFTP, a simple NFS server, a WebDAV server and so on. The client interface layer 114 (shown in FIG. 1) provides a single simplified view of the physical repositories. The file virtualization layer 112 (shown in FIG. 1) described above communicates with the physical repository via an associated gateway in the protocol gateways layer 116. Further, the protocol gateways layer 116 provides a global namespace of consolidated data. The file virtualization layer 112 also incorporates caching and replication features as described above with reference to FIG. 1 to enable faster transfer of data. Further in these embodiments, policy based management of the file virtualization layer 112 allows for administrative control, such as configuring modes, for discovering the physical repositories, setting a disk quota, caching parameters, write selection rules, automatic data migrations and so on. The VDS can be executed as a process on any one of the chosen servers connected to the computing network.

Figure 6:
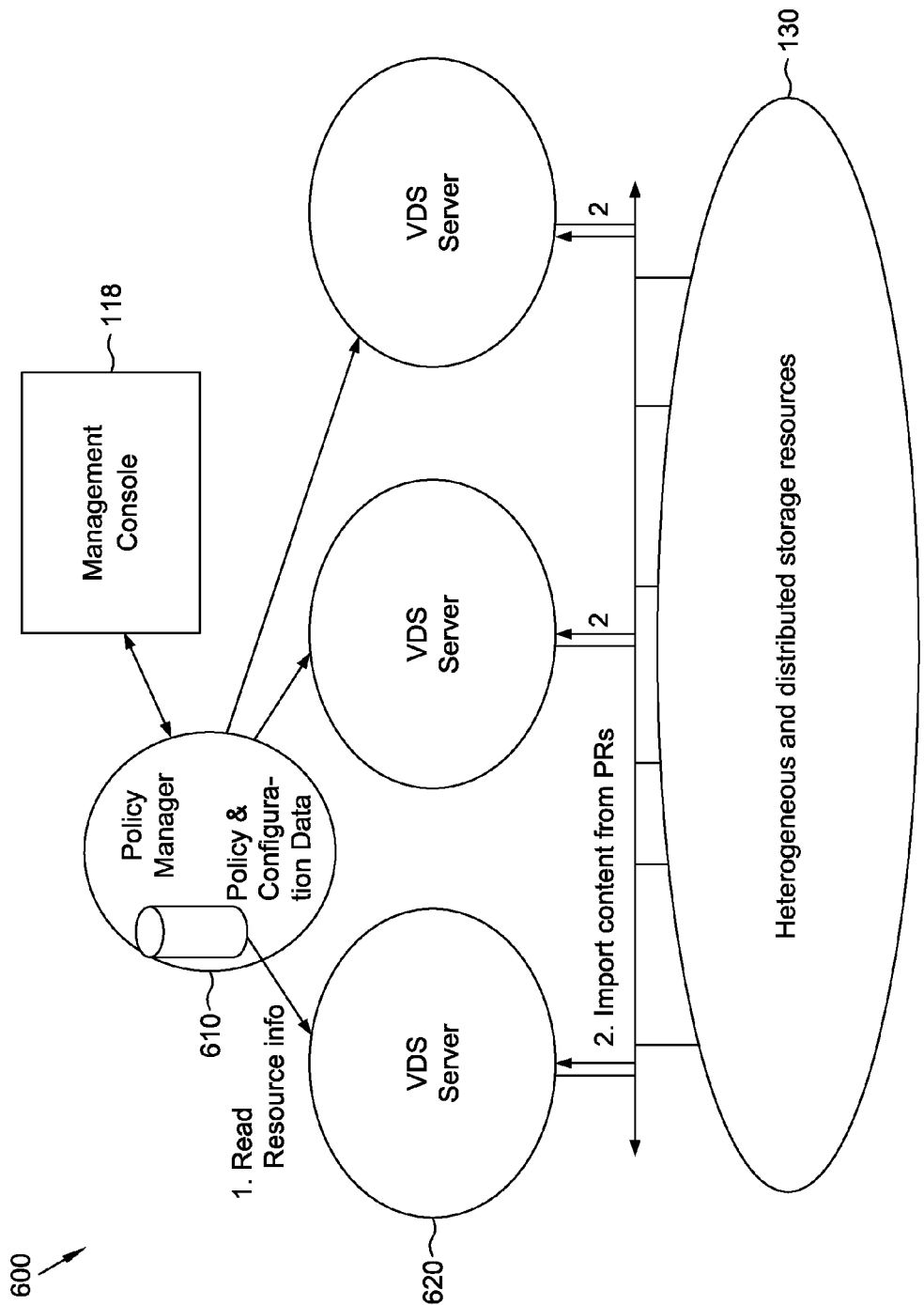
FIG. 6 is a block diagram illustrating a high level functionality of the multiple VDS servers with their single management console, according to one embodiment.

FIG. 6 is a block diagram 600 illustrating a high level functionality of multiple VDS servers 620 with their single management console 118, according to one embodiment. Particularly, FIG. 6 illustrates a policy manager 610, the multiple VDS servers 620, and the heterogeneous and distributed storage resources 130 (i.e., physical file systems hosted on associated file servers, heterogeneous file servers, and physical repositories). The policy manager 610 may configure administrative control parameters of the management console 118 that manages the data on its file virtualization layer 112 and physical file systems hosted in the heterogeneous and distributed storage resources 130.

Exemplary administrative control parameters are source and destination tiers of file systems, disk/user quota, data migration policies and actions based on file and/or storage attributes. In these embodiments, the management console 118 configures and/or monitors the heterogeneous and distributed storage resources 130 as well as the VDS server. It can be seen in FIG. 6, how the management console 118 configures and/or monitors the physical repositories 130 and the multiple VDS servers 620 hosting the VDS components 110. Furthermore, the above storage virtualization technique provides a transparent data migration between older and newer versions of storage devices to improve storage utilization and hence reduces the cost of ownership.

Figure 7:
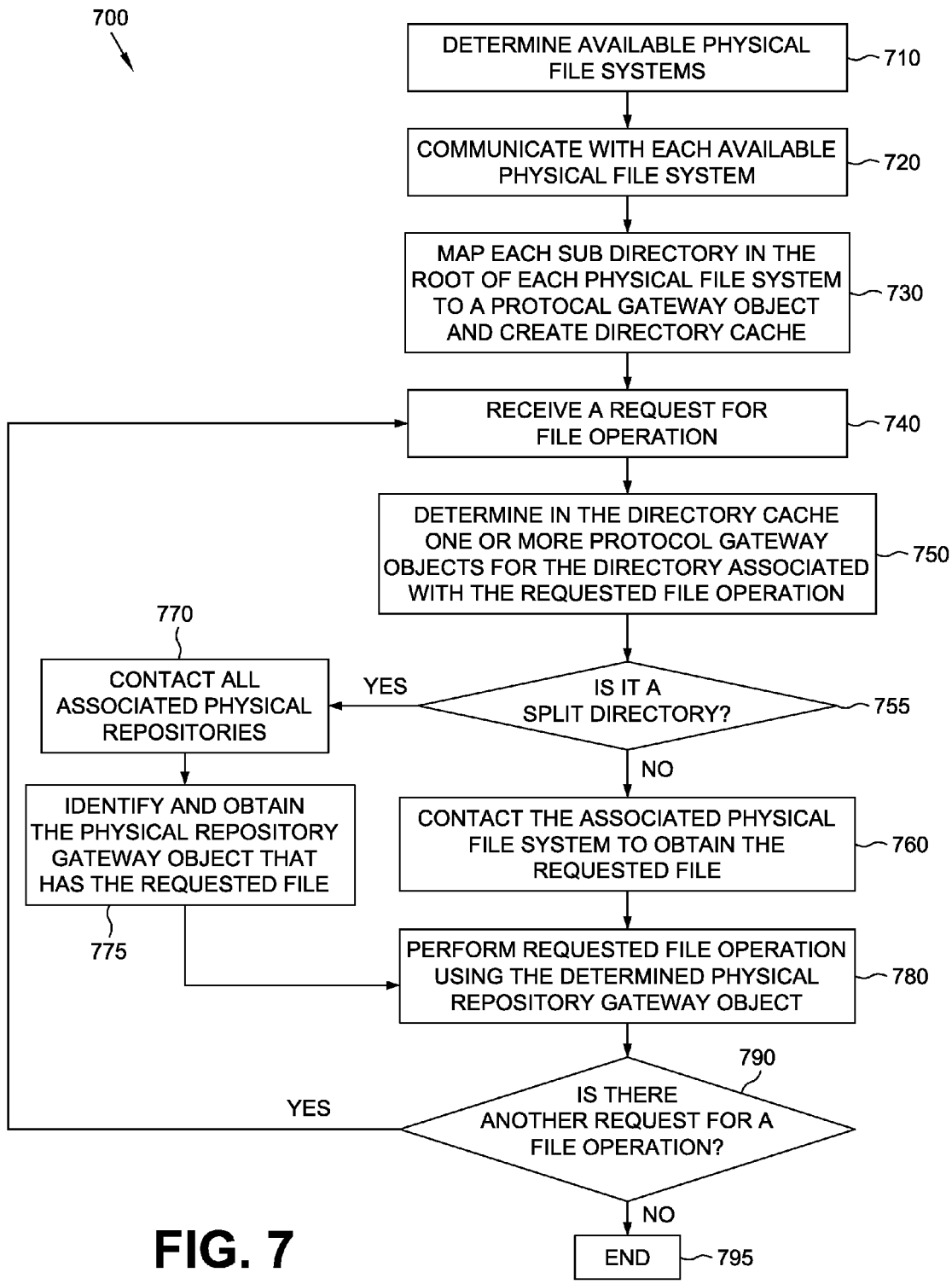
FIG. 7 is a process flow of virtualizing networked heterogeneous storage devices in a computing system, according to one embodiment.

FIG. 7 is a process flow of virtualizing networked heterogeneous storage devices in a computing system, according to one embodiment. In operation 710, upon startup of the computing system, available physical file systems to be virtualized are determined based on configuration information by a VDS server. In some embodiments, upon startup, the VDS server reads a configuration file to determine list of available physical repositories in a storage pool of the computing system, to be virtualized. During this operation, the VDS server also determines type of physical repositories connected to the computing system.

For example, the VDS server determines whether the physical repositories connected are NFS, localFS, Grid nodes, and/or CIFS based physical repositories. The VDS server may read the configuration information pertaining to details of the physical repositories to be included for virtualization. In these embodiments, the configuration information may include parameters, such as quota and so on. Also in these embodiments, the configuration information can be either static (such as in a file) or dynamic (provided by a web service, distributed databases, and the like).

In operation 720, the VDS server communicates with each available physical file system via an associated protocol gateway to determine list of subdirectories available in each root directory. The term 'root directory' refers to top level directories of the file systems exposed by the physical repositories, such as dir1, dir2, and so on. In some embodiments, the VDS server creates an instance of a corresponding gateway type object for each physical repository based on the type of physical repository and the protocol supported by the file system (such as Grid, CIFS, NFS, and the like).

In operation 730, the VDS server maps each subdirectory in the root of each physical file system to a protocol gateway object and creates mapping information. Further, in operation 730, the VDS server stores the mapping information in a directory cache. In some embodiments, the VDS server as part of initialization of the protocol gateway object collects list of top level directories (root directories) in each physical repository via a getRootDirectory method on the gateway for the corresponding physical file system. In these embodiments, one subdirectory in the root of each physical file system may have more than one physical repositories listed, which is referred to as a split directory. Also in these embodiments, the VDS server starts the protocol implementations that front end the virtual repository object—which may be DAV server, NFS server and CIFS server.

In operation 740, a request for file operation is received from a client by the VDS server. In some embodiments, a request with a full name is sent to the VDS server. For example, XXX/dir1/dir2/file 1. In operation 750, the VDS server determines, in the directory cache, one or more protocol gateway objects for the directory associated with the requested file operation to fetch the associated file and to perform the requested file operation.

In operation 755, the VDS server determines whether the subdirectories associated with the requested file is a split directory, i.e., the VDS server determines whether the requested file is in a directory that is split across multiple physical file systems. If the subdirectory is not a split directory, then the process flow 700 goes to operation 760, and contacts the associated physical file system to retrieve contents of a file from the associated directory in the physical file system. In operation 780, the VDS server performs the requested file operation using the determined physical repository gateway object.

If the determined directory is a split directory (i.e., if the requested file is in a directory that is split across multiple physical file systems), the process flow 700 goes to operation 770, and contacts all associated physical repositories. In operation 775, the VDS server identifies and obtains the physical repository gateway object that has the requested file. In a case where the file itself is split across multiple physical repositories, the retrieved files are combined to form the requested file. The process flow 700 then goes to operation 780 and performs file operation as described above. The process flow 700 then goes to operation 790 and determines whether there is another request for a file operation. The process flow 700 then goes to operation 795 and ends if there is no further request for a file operation, otherwise goes to operation 740 and repeats operations 750-790 if there is another request for a file operation.

In some embodiments, the directory cache located in the VDS server is refreshed for an associated subset of entries upon creating a new subdirectory in the root directory of any of the physical file systems. In the embodiment including multiple VDS servers (as shown FIG. 4), a synchronizing bus (e.g., that supports public-subscribe model of communication) is used to connect each VDS server to communicate creation of new root directories to the rest of the physical servers connected to the computing system for refreshing their associated directory caches. In some embodiments, the refreshing is performed periodically or when an access to a non-existent file or folder is made without using synchronizing bus.

In some embodiments, the VDS server supports replication by mangling a file name of a secondary/replica file based on an internal convention. If /dir1 is replicated, a physical repository 1 may have /dir1 and a physical repository 2 may have /.dir1.rep1. On a request from a client, the VDS server determines whether any of the subdirectories are replicated, and a version of the replica closer to the client is provided. Further, the VDS server maintains consistency between primary and replica files using conventionally known techniques, such as copy on write method used in distributed file systems, and the like.

In these embodiments, when all the directories are fetched, the VDS server determines whether any of the directories are replicated. The replica and primary files are fetched by the physical repository as needed, i.e., based on a specific file operation. In case the physical repository containing the primary copy fails, the VDS server trying to access data in that directory recognizes this failure (by looking at the only available mangled directory) and converts the replica copy to a primary copy. Also in these embodiments, the VDS server uses a file that is modified last on the replicated directory to maintain consistency of the replicas. This technique facilitates applying replication at any level in a directory hierarchy as specified by an admin in operation policies.

In some embodiments, locking of files is supported by the above storage virtualization technique to enable a number of clients to access the same file on the associated physical repository through the multiple VDS servers (as shown in FIG. 4). In these embodiments, the client has to use explicit file/dir locking calls to avail the same using an appropriate locking facility supported by the front end protocol, such as NFS locks, WebDAV locks and so on. A lock file named /.dir1.lock is created whenever locking is enforced by the client. This enables multiple VDS servers to have a common convention to access shared files. Further in these embodiments, the VDS server does not require any state information to support locking.

For example, on a Linux client, a DAV client is accessed through a virtual file system (VFS) support using a WebDAV protocol. A DAV server is mounted at a mount point using mount.davFS. The VFS client is built upon disconnected operation technology, such as Coda Networked File System so that even if there is a temporary network failure, the client may not be affected. In these embodiments, the client may see only a mount point, which is used to access the consolidated file system using normal file operations. Each file operation may be trapped by the kernel and sent to the VFS module (i.e., VDS component) which then dispatches to a davFS client.

Based on a type of operation, the davFS client can either perform the operation on a local copy of the file, for read and write calls, or contact the DAV server with an appropriate protocol method, such as for open, close.mkdir-GET/PUT/PROPFIND, and the like.

In some embodiments, the DAV server on receiving a DAV request (e.g., GET), accesses a Dir-FS mapper as outlined using the directional arrows 1-7 shown in FIG. 5 to determine a File System (FS) Gateway object to be used for the file operation and perform the requested file operation on the physical file. For example, an OPEN command on the client can result in a GET method on the DAV server, which in-turn may result in readFile method called on the localFS, NFS, or GridFS gateway for that physical repository. The physical repository may return the file which is then delivered to an end client.

In some embodiments, authentication controls of the physical repository are delegated to the VDS server as well. It can be envisioned that the file operation may be performed in the VDS server using user credentials accessing the virtual file system. This may be achieved by spawning a thread/process for each new user and assuming the user's ID in that process. The remaining operations may propagate the same user credentials.

Figure 8:
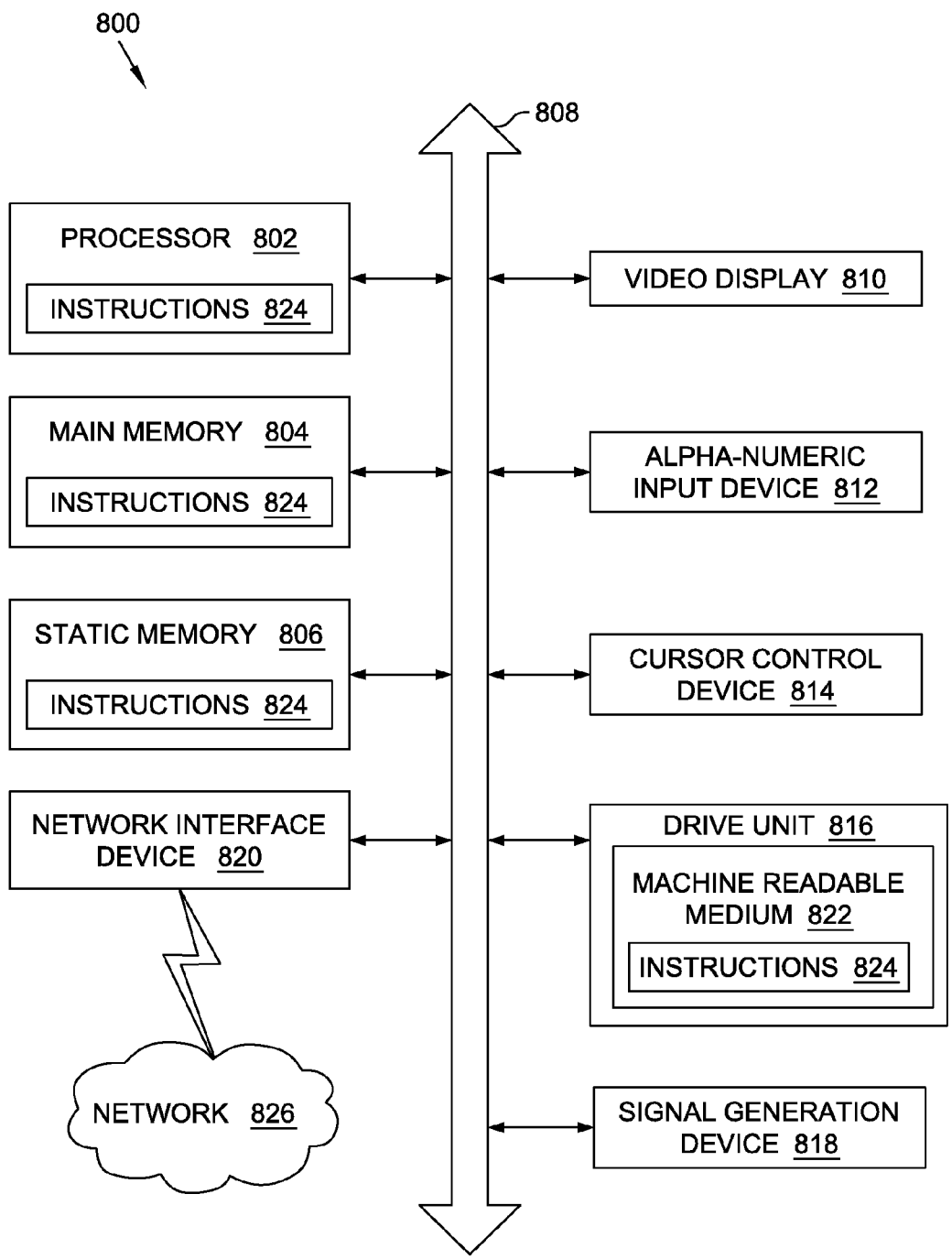
FIG. 8 is a diagrammatic system view of a data processing system in which any of the embodiments disclosed herein may be performed, according to one embodiment.

FIG. 8 is a diagrammatic system view 800 of a data processing system in which any of the embodiments disclosed herein may be performed, according to one embodiment. Particularly, the diagrammatic system view of FIG. 8 illustrates a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824 and a network 826, according to one embodiment.

The diagrammatic system view 800 may indicate a personal computer and/or a data processing system in which one or more operations disclosed herein are performed. The processor 802 may be a microprocessor, a state machine, an application specific integrated circuit, a field programmable gate array, etc. (e.g., Intel® Pentium® processor). The main memory 804 may be a dynamic random access memory and/or a primary memory of a computer system. The static memory 806 may be a hard drive, a flash drive, and/or other memory information associated with the data processing system.

The bus 808 may be an interconnection between various circuits and/or structures of the data processing system. The video display 810 may provide graphical representation of information on the data processing system. The alpha-numeric input device 812 may be a keypad, keyboard and/or any other input device of text (e.g., a special device to aid the physically handicapped). The cursor control device 814 may be a pointing device such as a mouse. The drive unit 816 may be a hard drive, a storage system, and/or other longer term storage subsystem.

The signal generation device 818 may be a bios and/or a functional operating system of the data processing system. The network interface device 820 may perform interface functions (e.g., code conversion, protocol conversion, and/or buffering) required for communications to and from the network 826 between a number of independent devices (e.g., of varying protocols). The machine readable medium 822 may provide instructions on which any of the methods disclosed herein may be performed. The instructions 824 may provide source code and/or data code to the processor 802 to enable any one or more operations disclosed herein.

For example, a storage medium having instructions, that when executed by a computing platform executes a method of virtualizing networked heterogeneous storage devices in a computing system, includes self discovering mapping information between a plurality of virtual file systems to a plurality of physical file systems (e.g., each physical file system may include a storage space in which a plurality of data files may be stored) upon startup by a VDS server.

The storage medium may have instructions to map a plurality of data files and associated folders in the plurality of virtual file systems to the plurality of files and associated folders in the plurality of physical file systems based on a current state of the plurality of physical file systems to discover and create mapping information upon startup. In addition, the storage medium may have instructions to store the mapping information in a directory cache by the VDS server.

The storage medium may have instructions to map root level folders associated with the plurality of virtual file systems to one or more protocol gateway objects associated with one or more physical file systems based on a current state of the plurality of physical file systems to obtain the mapping information upon startup. Further, the storage medium may have instructions to store the mapping information in the directory cache by the VDS server.

Furthermore, a computer system includes a processing unit and a memory coupled to the processor. The memory has code stored therein for virtualizing networked heterogeneous storage devices. The code causes the processor to self discover mapping information between a plurality of virtual file systems to a plurality of physical file systems upon startup by a VDS server. For example, the networked heterogeneous storage devices includes the plurality of physical file systems hosted on associated file server, and each physical file system includes a storage space in which a plurality of data files may be stored.

The above virtualization framework can also work with Grid protocols that provide end-to-end security through GSI (Grid Security Interface). In this mode, it enables a single sign-on access to different physical machines (logged in as possibly different users) through one common login. The proxy-delegated certificates that are generated for every session ensures that the Grid resources are mutually trusted entities (through host authentication) in addition to a user authentication.

The above technique provides search and scheduling algorithms that enable better utilization of the resources on a Grid. Further, the scheduling algorithm can ensure proximity of data for scheduling applications. The above technique supports heterogeneous mix of repositories types and further enables multiple ways of using a consolidated store. The consolidation at directory level provides a flat structure of all root directories of the physical file systems to an end user. Also, communication with the physical repositories on Grid nodes is based on the grid security model (GSI with proxy certificates). This broadens the usage of virtualizer across enterprises.

The above-described mapping algorithm is very useful in an event of failure of the VDS server. As the state information is not stored in the VDS server, the VDS server can come up like a stateless web server and start functioning without any loss of information.

Data migration policies in the above-described mapping algorithm may include a source tier and destination tier of storage elements for migration and condition for migration. The condition for migration could be based on a type and other attributes of the files being migrated. The parameters can be based on a usage of the file system and ownership of the files themselves. Exemplary custom migration policies include a policy to keep all files not accessed for last 1 year in a physical repository belonging to Tier 3, a policy that keeps all files smaller than 1 MB in any storage that is classified (by an administrator) as a FAST storage based on an access time metric, and the like.

The above virtualization technique can be provided as a service that can be deployed as needed. Further, the above-described virtualization technique can be scaled based on number of users with a light weight multiple VDS servers serving on a single virtualization store. It can be envisioned that by using multiple VDS servers, a significant performance improvement can be achieved by load balancing across servers and replicating data. Further, using the multiple VDS servers can improve availability of the VDS. This can be achieved by enabling fail over among the multiple VDS servers.

For example, availability of the VDS servers may be improved by using an application availability product. The above-described virtualization framework can support multiple protocols to access the physical repositories and/or can provide multiple protocols to access the virtual physical repositories. Further, the above virtualization framework is non-intrusive, i.e., neither the client nor the physical repositories needs to be changed to use or contribute to the virtual store operation.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of virtualizing networked heterogeneous storage devices in a computing system, wherein the networked heterogeneous storage devices includes a plurality of physical file systems hosted on associated file servers, and wherein each physical file system includes a storage space in which a plurality of data files may be stored comprising:
   self discovering mapping information between a plurality of virtual file systems to the plurality of physical file systems upon startup by a virtual data store (VDS) server, comprising:
      determining available physical file systems to be virtualized based on configuration information;
      communicating with each available physical file system via an associated protocol gateway to determine list of subdirectories in each root directory, wherein each root directory comprises top level directories of each physical file system;
      mapping each subdirectory of each physical file system to a protocol gateway object and creating mapping information; and
      storing the mapping information in a directory cache by the VDS server.

2. The method of claim 1, wherein self discovering the mapping information between the plurality of virtual file systems to the plurality of physical file systems upon startup comprises:
   mapping a plurality of files and associated folders in the plurality of virtual file systems to the plurality of files and associated folders in the plurality of physical file systems based on a current state of the plurality of physical file systems to discover and create mapping information upon startup; and
   storing the mapping information in the directory cache by the VDS server.

3. The method of claim 2, wherein mapping the plurality of files and the associated folders in the plurality of virtual file systems to the plurality of files and the associated folders in the plurality of physical file systems comprises:
   mapping root level folders associated with the plurality of virtual file systems to one or more protocol gateway objects associated with the plurality of physical file systems based on a current state of the plurality of physical file systems to obtain the mapping information upon startup; and
   storing the mapping information in the directory cache by the VDS server.

4. The method of claim 1, further comprising:
   obtaining an associated physical file based on the stored mapping information upon receiving a request for a virtual file from a client by the VDS server.

5. The method of claim 4, wherein obtaining the associated physical file comprises:
   determining the physical repository gateway object upon receiving a request for a virtual file from a client by determining the subdirectory name of the requested file and locating the subdirectory name in the mapping information; and
   obtaining the associated physical file via the determined physical repository gateway object to obtain the requested virtual file and to perform the requested file operation on the obtained file.

6. The method of claim 3, further comprising:
   refreshing the directory cache located in the VDS server for a subset of entries upon creating a new subdirectory in a root directory in anyone of the file systems hosted on associated one of the plurality of physical file systems.

7. The method of claim 3, further comprising:
   if the requested file is located in the plurality of physical file systems, then contacting each associated physical file system to check to obtain the requested file.

8. The method of claim 3, further comprising:
   determining whether any of the subdirectories in each root directory are split directories;
   if so, retrieving files from each of the split directories; and combining the retrieved files to form the requested file.

9. The method of claim 3, further comprising:
   determining whether any of the subdirectories are replicated; and
   if so, obtaining primary and replica files from replicated directories and providing a file that is substantially closer to a primary file and maintaining consistency between the primary and replica files.

10. The method of claim 1, wherein the associated file servers comprise heterogeneous file servers providing different file system protocols, wherein the heterogeneous file servers are selected from the group consisting of Grid file servers, Unix file servers, and Windows file servers, Web-based file server, and wherein the file system protocols are selected from the group consisting of Grid file transfer protocol (Grid-FTP), network-attached storage file system (NFS) protocol, common Internet file system (CIFS) protocol, and Web-based distributed authoring and versioning (WebDAV) protocol, respectively.

11. A non-transitory computer readable storage medium having instructions, that when executed by a computing platform, result in execution of a method of virtualizing networked heterogeneous storage devices in a computing system comprising:
    self discovering mapping information between a plurality of virtual file systems to a plurality of physical file systems upon startup by a virtual data store (VDS) server, wherein the networked heterogeneous storage devices includes the plurality of physical file systems hosted on associated file servers, and wherein each physical file system includes a storage space in which a plurality of data files may be stored, comprising:
        determining available physical file systems to be virtualized based on configuration information;
        communicating with each available physical file system via an associated protocol gateway to determine list of subdirectories in each root directory, wherein each root directory comprises top level directories of each physical file system;
        mapping each subdirectory of each physical file system to a protocol gateway object and creating mapping information; and
        storing the mapping information in a directory cache by the VDS server.

12. The non-transitory computer readable storage medium of claim 11, wherein self discovering the mapping information between the plurality of virtual file systems to the plurality of physical file systems upon startup comprises:
    mapping a plurality of files and associated folders in the plurality of virtual file systems to the plurality of files and associated folders in the plurality of physical file systems based on the current state of the plurality of physical file systems to discover and create mapping information upon startup; and
    storing the mapping information in the directory cache by the VDS server.

13. The non-transitory computer readable storage medium of claim 11, wherein mapping the plurality of files and the associated folders in the plurality of virtual file systems to the plurality of files and the associated folders in the plurality of physical file systems comprises:
    mapping root level folders associated with the plurality of virtual file systems to one or more protocol gateway objects associated with the plurality of physical file systems based on a current state of the plurality of physical file systems to obtain the mapping information upon startup; and
    storing the mapping information in the directory cache by the VDS server.

14. The non-transitory computer readable storage medium of claim 11, further comprising:
    obtaining an associated physical file based on the stored mapping information upon receiving a request for a virtual file from a client by the VDS server.

15. A virtual enterprise file system comprising:
    a plurality of clients;
    a plurality of file systems located in associated physical repositories and wherein each physical file system includes a storage space in which a plurality of data files may be stored; and
    a virtual data store (VDS) server hosting a VDS component, wherein the VDS component self discovers mapping information from a plurality of virtual file systems to the plurality of physical file systems upon startup, wherein the VDS component comprises:
        a protocol gateways layer;
        a presentation protocol layer; and
        a file virtualization layer, wherein the file virtualization layer determines available physical file systems to be virtualized based on a configuration information upon startup, wherein the file virtualization layer reviews the configuration information and determines available physical file systems to be virtualized, wherein the file virtualization layer communicates with each available physical file system via an associated gateway in the protocol gateways layer to determine list of subdirectories in each root directory, wherein each root directory comprises top level directories of each physical file system, and wherein the file virtualization layer maps each subdirectory of each physical file system to protocol gateway object and creates mapping information and stores the mapping information in a directory cache.

16. The system of claim 15, wherein the presentation protocol layer receives a request for a virtual file from a client, and wherein the protocol gateways layer obtains an associated physical file via the determined physical repository gateway object based on the stored mapping information to obtain the requested virtual file to perform a requested file operation.

17. The system of claim 15, wherein the VDS component further comprises:
    a policy engine for configuring administrative control parameters of the file virtualization layer and the physical file systems, wherein the administrative control parameters are selected from the group consisting of source and destination tiers of file systems, disk/user quota, data migration policies and actions based on file and storage attributes.

18. The system of claim 15, wherein the file virtualization layer refreshes the directory cache located in the VDS server for a subset of entries upon creating a new subdirectory in a new root directory in anyone of the plurality of physical file systems hosted on associated one of the physical repositories.

19. A virtual enterprise file system comprising:
    a plurality of clients;
    a plurality of file systems located in associated physical repositories and wherein each physical file system includes a storage space in which a plurality of data files may be stored; and
    multiple virtual data store (VDS) servers, wherein each VDS server hosts a VDS component, wherein the VDS component in one of the multiple VDS servers self discovers the mapping of the files and the folders of a plurality of virtual file systems to the files and folders on plurality of physical file systems upon startup, wherein the VDS component comprises:
        a protocol gateways layer;
        a client interface layer; and
        a file virtualization layer, wherein the file virtualization layer determines available physical file systems to be virtualized based on a configuration information upon startup, wherein the file virtualization layer reviews the configuration information and determines available physical file systems to be virtualized, wherein the file virtualization layer communicates with each available physical file system via an associated gateway in the protocol gateways layer to determine list of subdirectories in each root directory, wherein each root directory comprises top level directories of each physical file system, and wherein the file virtualization layer maps each subdirectory of each physical file system to protocol gateway object and creates mapping information and stores in a directory cache.

20. The system of claim 19, wherein the client interface layer receives a request for a virtual file from a client and wherein the file virtualization layer determines the physical repository gateway object to be used to process the request and the protocol gateways layer obtains an associated physical file via a determined physical repository gateway object based on the stored mapping information to obtain the requested virtual file to perform a requested file operation.

* * * * *